(12) United States Patent
Camus et al.

(10) Patent No.: US 7,974,442 B2
(45) Date of Patent: Jul. 5, 2011

(54) VEHICULAR VISION SYSTEM

(75) Inventors: Theodore Armand Camus, Mount Laurel, NJ (US); David Hirvonen, Portland, OR (US); Robert Mandelbaum, Bala Cynwyd, PA (US); Billie Joe Call, Allentown, NJ (US); Ian Gregory Hill, Hightstown, NJ (US); André Rieder, Regensburg (DE); John Benjamin Southall, Philadelphia, PA (US)

(73) Assignees: SRI International, Menlo Park, CA (US); Ford Global Technologies, Inc., Dearborn, MI (US)

( * ) Notice: Subject to any disclaimer, the term of this patent is extended or adjusted under 35 U.S.C. 154(b) by 998 days.

(21) Appl. No.: 11/837,114

(22) Filed: Aug. 10, 2007

(65) Prior Publication Data

US 2008/0159620 A1    Jul. 3, 2008

Related U.S. Application Data

(63) Continuation of application No. 10/461,699, filed on Jun. 13, 2003, now Pat. No. 7,263,209.

(51) Int. Cl.
*G06K 9/00* (2006.01)
*G06K 9/62* (2006.01)

(52) U.S. Cl. ........ 382/103; 382/154; 382/209; 348/118; 348/148

(58) Field of Classification Search .......... 382/103–107, 382/209, 216–219, 154; 348/113–120, 143–149, 348/169–172
See application file for complete search history.

(56) References Cited

U.S. PATENT DOCUMENTS

| | | | |
|---|---|---|---|
| 5,742,141 A | 4/1998 | Czekaj | |
| 5,748,796 A | 5/1998 | Pennino et al. | |
| 5,778,107 A | 7/1998 | Kataoka | |
| 5,926,126 A | 7/1999 | Engelman | |

(Continued)

FOREIGN PATENT DOCUMENTS

EP    0885782    12/1998

(Continued)

OTHER PUBLICATIONS

Rosenfeld et al. "Coarse-Fine Template Matching". IEEE Transactions on Systems, Man and Cybernetics. Feb. 1977, pp. 104-107.

(Continued)

*Primary Examiner* — Aaron W Carter
(74) *Attorney, Agent, or Firm* — Lowenstein Sandler PC

(57) ABSTRACT

A vision system for a vehicle that identifies and classifies objects (targets) located proximate a vehicle. The system comprises a sensor array that produces imagery that is processed to generate depth maps of the scene proximate a vehicle. The depth maps are processed and compared to pre-rendered templates of target objects that could appear proximate the vehicle. A target list is produced by matching the pre-rendered templates to the depth map imagery. The system processes the target list to produce target size and classification estimates. The target is then tracked as it moves near a vehicle and the target position, classification and velocity are determined. This information can be used in a number of ways. For example, the target information may be displayed to the driver, the information may be used for an obstacle avoidance system that adjusts the trajectory or other parameters of the vehicle to safely avoid the obstacle. The orientation and/or configuration of the vehicle may be adapted to mitigate damage resulting from an imminent collision, or the driver may be warned of an impending collision.

41 Claims, 3 Drawing Sheets

U.S. PATENT DOCUMENTS

| | | |
|---|---|---|
| 6,259,815 B1 | 7/2001 | Anderson et al. |
| 6,396,535 B1 | 5/2002 | Waters |
| 6,411,871 B1 | 6/2002 | Lin |
| 6,442,484 B1 | 8/2002 | Miller et al. |
| 6,452,535 B1 | 9/2002 | Rao et al. |
| 6,480,102 B1 | 11/2002 | Miller et al. |
| 6,493,465 B2 * | 12/2002 | Mori et al. .................... 382/209 |
| 6,498,972 B1 | 12/2002 | Rao et al. |
| 6,535,242 B1 | 3/2003 | Strumolo et al. |
| 6,956,469 B2 * | 10/2005 | Hirvonen et al. ............. 340/435 |
| 7,068,815 B2 * | 6/2006 | Chang et al. .................. 382/106 |
| 7,230,640 B2 | 6/2007 | Regensburger et al. |
| 7,263,209 B2 * | 8/2007 | Camus et al. .................. 382/104 |
| 7,403,659 B2 * | 7/2008 | Das et al. ...................... 382/224 |
| 7,486,803 B2 * | 2/2009 | Camus .......................... 382/104 |
| 7,660,436 B2 * | 2/2010 | Chang et al. .................. 382/104 |
| 7,660,438 B2 * | 2/2010 | Camus .......................... 382/104 |
| 7,672,514 B2 * | 3/2010 | Chang et al. .................. 382/199 |
| 2002/0039438 A1 * | 4/2002 | Mori et al. .................... 382/154 |
| 2004/0252862 A1 * | 12/2004 | Camus et al. .................. 382/104 |
| 2004/0252863 A1 * | 12/2004 | Chang et al. .................. 382/104 |
| 2004/0252864 A1 * | 12/2004 | Chang et al. .................. 382/104 |
| 2004/0258279 A1 * | 12/2004 | Hirvonen et al. ............. 382/104 |
| 2005/0084156 A1 * | 4/2005 | Das et al. ...................... 382/224 |
| 2005/0131646 A1 * | 6/2005 | Camus .......................... 701/301 |
| 2005/0232463 A1 * | 10/2005 | Hirvonen et al. ............. 382/103 |
| 2005/0232491 A1 * | 10/2005 | Chang et al. .................. 382/199 |
| 2008/0159620 A1 * | 7/2008 | Camus et al. .................. 382/154 |
| 2009/0195371 A1 * | 8/2009 | Camus .......................... 340/435 |

FOREIGN PATENT DOCUMENTS

| | | |
|---|---|---|
| EP | 1030188 | 8/2000 |
| GB | 2265779 | 10/1993 |
| WO | 9319441 | 9/1993 |

OTHER PUBLICATIONS

Leung, Mun K et al., "Detecting Wheels of Vehicle in Stereo Images." Proceedings of the International Conference on Pattern Recognition, Atlantic City, pp. 263-267 (Jun. 16-17, 1990).

EP 04776578 Supplementary European Search Report (May 29, 2009).

* cited by examiner

VEHICULAR VISION SYSTEM

CROSS REFERENCE TO RELATED APPLICATIONS

This application is a continuation of U.S. patent application Ser. No. 10/461,699 filed Jun. 13, 2003, now U.S. Pat. No. 7,263,209 the entire disclosure of which is incorporated herein by reference.

BACKGROUND OF THE INVENTION

1. Field of the Invention

The present invention relates to vehicular vision systems. In particular, the present invention relates to a method and apparatus for providing target detection to facilitate collision avoidance and/or mitigation.

2. Description of the Related Art

Collision avoidance systems utilize a sensor for detecting objects in front of an automobile or other form of vehicle. The sensor may be a radar, an infrared sensor or an optical vision system. The sensor generates a rudimentary image of the scene in front of the vehicle and, by processing that imagery, obstacles can be detected within the imagery.

These collision avoidance systems identify that an obstacle exists in front of a vehicle, but do not classify the obstacle nor provide any information regarding the movement of the obstacle. As such, the driver of the vehicle may be warned of an obstacle or the automobile may take evasive action regarding an obstacle, yet that obstacle may present no danger to the vehicle.

Therefore, there is a need in the art for a method and apparatus that provides a vehicular vision system that classifies obstacles to facilitate obstacle avoidance.

SUMMARY OF THE INVENTION

The invention provides a vision system for a vehicle that identifies and classifies objects (targets) located proximate a vehicle. The system comprises a sensor array that produces imagery that is processed to generate depth maps (or depth images) of the scene proximate a vehicle. The depth maps are processed and compared to pre-rendered templates of target objects that could appear proximate the vehicle. A target list is produced by matching the pre-rendered templates to the depth map imagery. The system processes the target list to produce target size and classification estimates. The target is then tracked as it moves near a vehicle and the target position, classification and velocity are determined. This information can be used in a number of ways. For example, the target information may be displayed to the driver, or the information may be used for an obstacle avoidance system that adjusts the trajectory or other parameters of the vehicle to safely avoid the obstacle. The orientation and/or configuration of the vehicle may be adapted to mitigate damage resulting from an imminent collision, or the driver may be warned of an impending collision.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
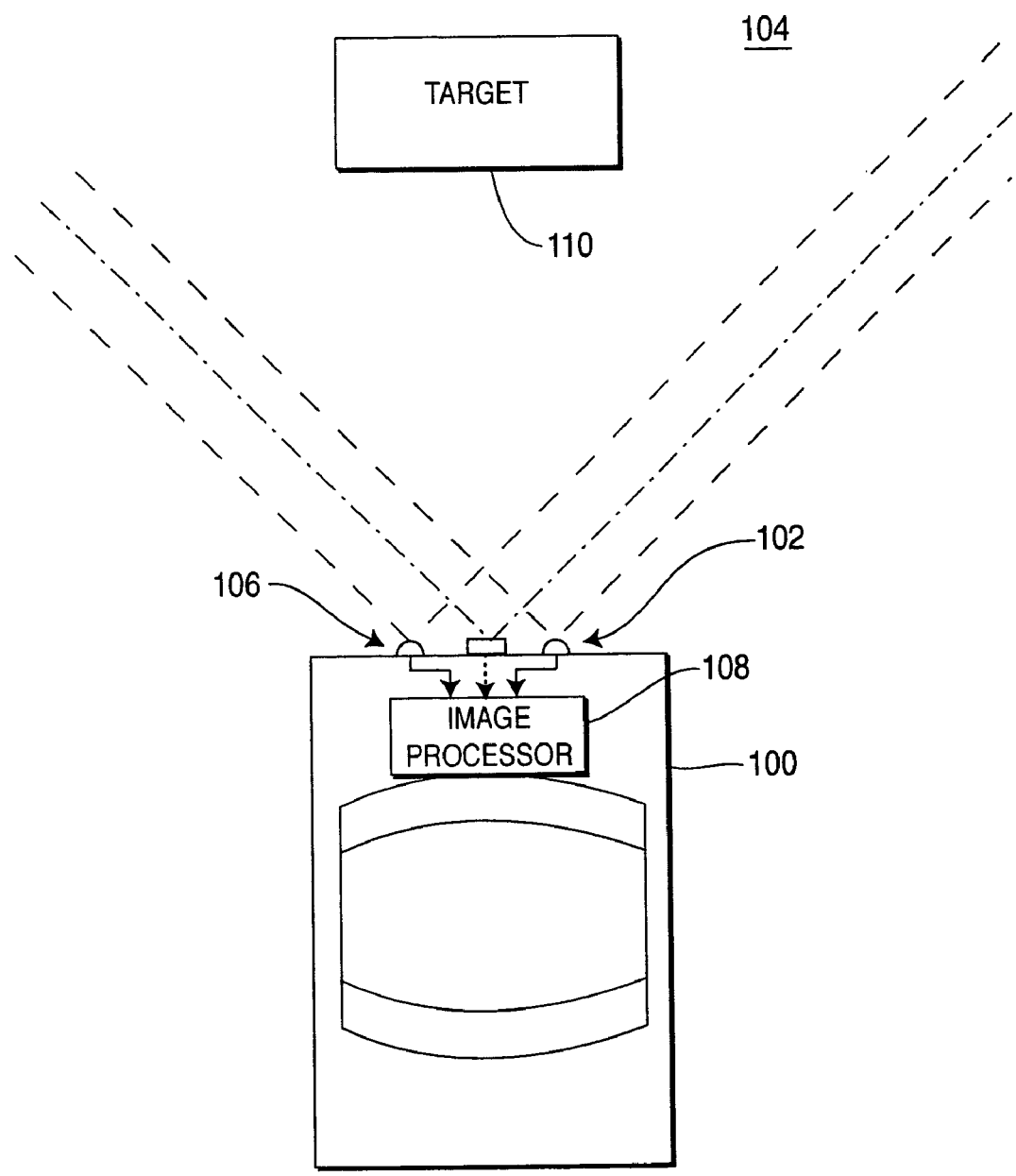
FIG. 1 depicts a schematic view of a vehicle utilizing the present invention.

FIG. 1 depicts a schematic diagram of a vehicle 100 utilizing a vision system 102 to image a scene 104 that is located proximate vehicle 100. In the embodiment shown, the imaged scene is in front of the vehicle 100. Other applications of the system 102 may image a scene that is behind or to the side of the vehicle. The vision system 102 comprises sensor array 106 coupled to an image processor 108. The sensors within the array 106 have a field of view that images a target 110 that is located in front of the vehicle 100. The field of view of the sensors in a practical system may be ±12 meters horizontally in front of the automobile (e.g., approximately 3 traffic lanes), a ±3 meter vertical area and provides a view of approximately 40 meters in front of the vehicle.

Figure 2:
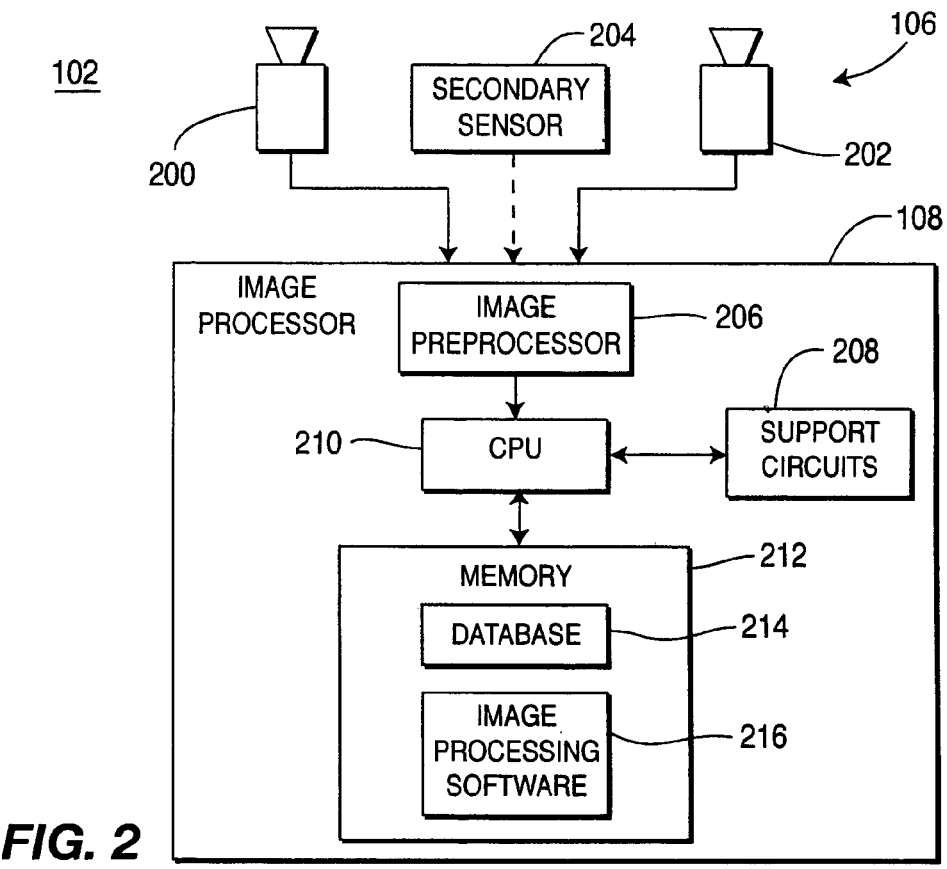
FIG. 2 depicts a block diagram of a vehicular vision system of the present invention.

FIG. 2 depicts a block diagram of the hardware used to implement the vision system 102. The sensor array 106 comprises, for example, a pair of optical cameras 200 and 202 and an optional secondary sensor 204. The secondary sensor 204 may be a radar transceiver, a LIDAR transceiver, an infrared range finder, sonar range finder, and the like. The cameras 200 and 202 generally operate in the visible wavelengths, but may be augmented with infrared sensors, or they may be infrared sensors themselves without operating in the visible range. The cameras have a fixed relation to one another such that they can produce a stereo image of the scene.

The image processor 108 comprises an image preprocessor 206, a central processing unit (CPU) 210, support circuits 208, and memory 212. The image preprocessor 206 generally comprises circuitry for capturing, digitizing and processing the imagery from the sensor array 106. The image preprocessor may be a single chip video processor such as the processor manufactured under the model Acadia I™ by Pyramid Vision Technologies of Princeton, N.J.

The processed images from the image preprocessor 206 are coupled to the CPU 210. The CPU 210 may comprise any one of a number of presently available high speed microcontrollers or microprocessors. The CPU 210 is supported by support circuits 208 that are generally well known in the art. These circuits include cache, power supplies, clock circuits, input-output circuitry, and the like. Memory 212 is also coupled to the CPU 210. Memory 212 stores certain software routines that are executed by the CPU 210 to facilitate operation of the invention. The memory may store certain databases 214 of information that are used by the invention as well as store the image processing software 216 that is used to process the imagery from the sensor array 106. Although the invention is described in the context of a series of method steps, the method may be performed in hardware, software, or some combination of hardware and software.

Figure 3:
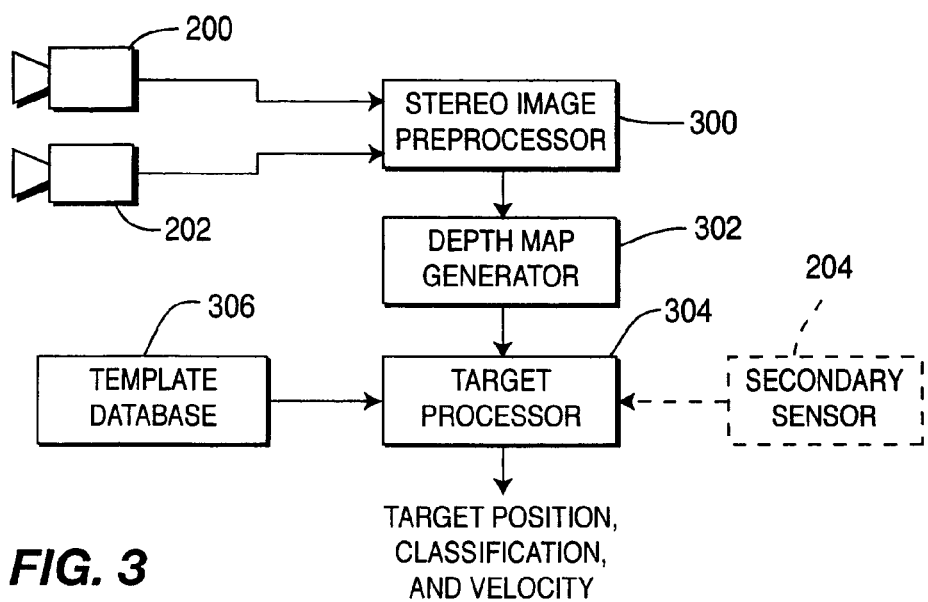
FIG. 3 depicts a block diagram of the functional modules of the vision system of FIG. 2.

FIG. 3 is a functional block diagram of the functional modules that are used to implement the present invention. The sensors 200 and 202 provide stereo imagery to a stereo image preprocessor 300. The stereo image preprocessor is coupled to a depth map generator 302 which is coupled to the target processor 304. The target processor receives information from a template database 306 and from the optional secondary sensor 204.

The two cameras 200 and 202 are coupled to the stereo image preprocessor 300 which, for example, uses an Acadia I™ circuit. The preprocessor 300 calibrates the cameras, captures and digitizes imagery, warps the images into alignment, and performs pyramid wavelet decomposition to create multi-resolution disparity images. Each of the disparity images contains the point-wise motion from the left image to the right image. The greater the computed disparity of an imaged object, the closer the object is to the sensor array.

The depth map generator 302 processes the multi-resolution disparity images into a two-dimensional depth image. The depth image (also referred to as a depth map) contains image points or pixels in a two dimensional array, where each point represents a specific distance from the sensor array to point within the scene. The depth image is then processed by the target processor 304 wherein templates (models) of typical objects encountered by the vision system are compared to the information within the depth image. As described below, the template database 306 comprises templates of objects (e.g., automobiles) located at various positions and depth with respect to the sensor array. An exhaustive search of the template database may be performed to identify a template that most closely matches the present depth image. The secondary sensor 204 may provide additional information regarding the position of the object relative to the vehicle, velocity of the object, size or angular width of the object, etc., such that the target template search process can be limited to templates of objects at about the known position relative to the vehicle. If the secondary sensor is a radar, the sensor can, for example, provide an estimate of both object position and distance. The target processor 304 produces a target list that is then used to identify target size and classification estimates that enable target tracking and the identification of each target's position, classification and velocity within the scene. That information may then be used to avoid collisions with each target or perform pre-crash alterations to the vehicle to mitigate or eliminate damage (e.g., lower or raise the vehicle, deploy air bags, and the like).

Figure 4:
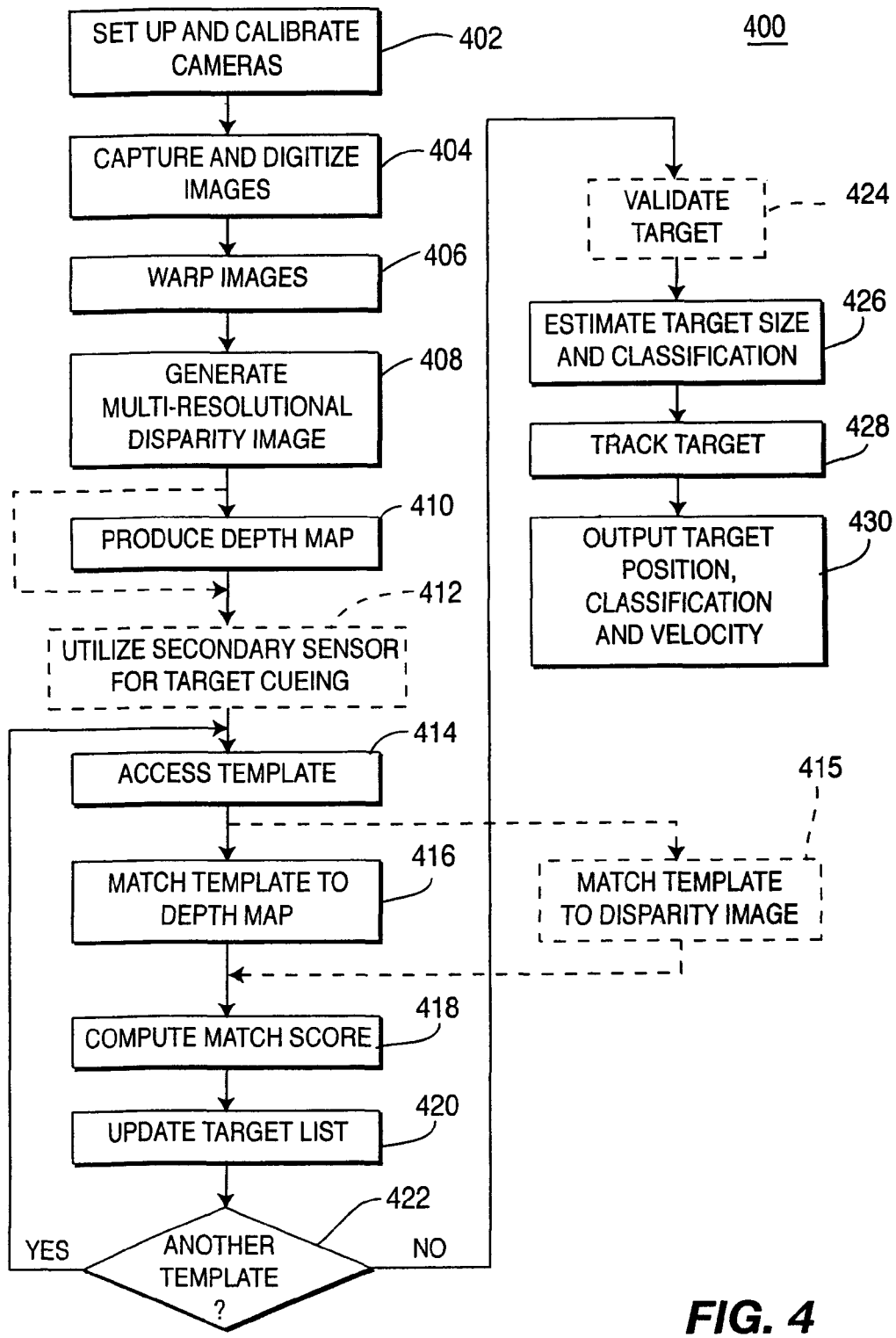
FIG. 4 depicts a flow diagram of the operation of the vision system of FIG. 2.

FIG. 4 depicts a flow diagram of a method 400 showing the operation of the present invention. The method 400 begins with the setup and calibration of the cameras at step 402. At step 404, the method captures and digitizes the images from the cameras. At step 406, the imagery generated from each of the cameras is warped into alignment to facilitate producing disparity images. At step 408, the method 400 generates multi-resolution disparity images from the camera images using pyramid wavelet decomposition. Steps 402, 404, 406 and 408 are performed within an off-the-shelf stereo image preprocessing circuit such as the Acadia I™ circuit. The multi-resolution disparity image is created for each pair of frames generated by the stereo cameras. The disparity image comprises, in addition to the disparity information, an indication of which of the disparity pixels in the image are deemed valid or invalid. Certain disparity values may be deemed invalid because of image contrast anomalies, lighting anomalies and other factors. This valid/invalid distinction is used in processing the depth image as described below.

At step 410, the multi-resolution disparity image is used to produce a depth map. This transformation is not required but in the present embodiment it simplifies subsequent computation. The depth map (also known as a depth image or range image) comprises a two-dimensional array of pixels, where each pixel represents the depth within the image at that pixel to a point in the scene. As such, pixels belonging to objects in the image will have a depth to the object and all other pixels will have a depth to the horizon or to the roadway in front of the vehicle.

To confirm that an object exists in the field of view of the cameras, step 412 may be implemented to utilize a secondary sensor signal for target cueing. For example, if the secondary sensor is a radar, the sensor produces an estimate of the range and position of the object. As such, the template matching process will require less time since the template search will be restricted to the radar provided position and depth estimate.

Steps 414, 416, 418, 420 and 422 are used to search a template database to match templates to the depth map. The database comprises a plurality of pre-rendered templates, e.g., depth models of various types of vehicles that are typically seen by the vehicle. In one embodiment, the database is populated with multiple automobile depth models at positions in a 0.25 meter resolution 3-D volume within the scene in front of the vehicle. In this embodiment, the vertical extent of the volume is limited due to the expected locations of vehicles on roadways. The depth image is a two-dimensional digital image, where each pixel expresses the depth of a visible point in the scene with respect to a known reference coordinate system. As such, the mapping between pixels and corresponding scene points is known. The method 400 employs a depth model based search, where the search is defined by a set of possible vehicle location pose pairs. For each such pair, a depth model of the operative vehicle type (e.g., sedan or truck) is rendered and compared with the observed scene range image via a similarity metric. The process creates an image with dimensionality equal to that of the search space, where each axis represents a vehicle model parameter, and each pixel value expresses a relative measure of the likelihood that a vehicle exists in the scene with the specific parameters.

Generally, an exhaustive search is performed where the template is accessed in step 414, then the template is matched to the depth map at 416. At step 418, a match score is computed and assigned to its corresponding pixel within the image where the value (score) is indicative of the probability that a match has occurred. Regions of high density (peaks) in the scores image indicate the presence of structure in the scene that is similar in shape to the employed model. These regions (modes) are detected with a mean shift algorithm of appropriate scale. Each pixel is shifted to the centroid of its local neighborhood. This process is iterated until convergence for each pixel. All pixels converging to the same point are presumed to belong to the same mode, and modes that satisfy a minimum score and region of support criteria are then used to initialize the vehicle detection hypotheses. At step 420, the target list is updated if the match scores are large enough to indicate that the target has been identified.

The match score can be derived in a number of ways. In one embodiment, the depth difference at each pixel between the template and the depth image are summed across the entire image and normalized by the total number of pixels in the template. In another embodiment, the comparison (difference) at each pixel can be used to determine a yes or no "vote" for that pixel (e.g., vote yes if the depth difference is less than one meter, otherwise vote no). The yes votes can be summed and normalized by the total number of pixels in the template to form a match score for the image. In another embodiment, the top and bottom halves of the template are compared separately to the depth image. At each pixel, if the value of the template depth is within one meter of the value of the depth image, a yes "vote" is declared. The votes in the top and bottom image halves are summed separately to provide a percentage of yes votes to the total number of pixels. The top and bottom percentages are multiplied together to give a final match score.

At step 422, the method 400 queries whether another template should be used. If another template should be used or the exhaustive search has not been completed, the method 400 returns to step 414 to select another template for matching to the depth map. The templates are iteratively matched to the depth map in this manner in an effort to identify the object or objects within the scene.

In one embodiment, during the template matching process, the process speed can be increased by skipping ahead in larger increments of distance than typically used depending upon how poor the match score is. As such, normal distance increments are ¼ of a meter but if the match score is so low for a particular template than the distance may be skipped in a larger increment, for example, one meter. Thus, a modified exhaustive search may be utilized. When the exhaustive search is complete, method 400 continues to optional step 424. The secondary sensor information is used to confirm that an object does exist. As such, once the target is identified, the secondary sensor information may be compared to the identified target to validate that the target is truly in the scene. Such validation reduces the possibility of a false positive occurring. At step 424, the target list from the vision system is compared against a target list developed by the secondary sensor. Any target that is not on both lists will be deemed a non-valid target and removed from the target lists.

At step 426, the target size and classification is estimated by processing the depth image to identify the edges of the target. The original images from the cameras may also be used to identify the boundaries of objects within the image. The size (height and width) of the target are used to classify the target as a sedan, SUV, truck, etc. At step 428, the target and its characteristics (boundaries) are tracked across frames from the sensors. A recursive filter such as a Kalman filter may be used to process the characteristics of the targets to track the targets from frame to frame. Such tracking enables updating of the classification of the target using multiple frames of information.

At step 430, the method 400 outputs target position, classification and velocity. This information can be used for pre-crash analysis by a vehicle's collision avoidance system to enable the vehicle to make adjustments to the parameters of the vehicle to mitigate or eliminate damage. Such processing may allow the automobile's attitude or orientation to be adjusted, (e.g., lower or raise the bumper position to optimally impact the target) the air-bags may be deployed in a particular manner to safeguard the vehicle's occupants with regard to the classification and velocity of target involved in the collision, and the like.

While the foregoing has described a system that uses a multi-resolution disparity image (or map) to produce a depth map in step 414, as previously noted this is not required. For example, the dashed lines in FIG. 4 illustrate a method in which the multi-resolution disparity image produced in step 408 is used directly, rather than for the production of a depth map, step 410. As illustrated, after generation of the multi-resolution disparity image in step 408, a secondary sensor is used for target cueing, step 412, to confirm that an object exists in the field of view of the cameras.

Then, the template database, which now comprises a plurality of pre-rendered templates of multi-resolution disparity images, e.g., disparity images of various types of vehicles, is searched, step 414. A match test is then performed to match the templates to the multi-resolution disparity image, step 415. Then, a match score is computed, step 418, and the target list is updated, step 420. A decision is then made whether another template is to be used, step 422. If so, a loop is made back to step 414.

While the foregoing is directed to embodiments of the present invention, other and further embodiments of the invention may be devised without departing from the basic scope thereof, and the scope thereof is determined by the claims that follow.

The invention claimed is:

1. A method of performing vehicular vision processing comprising:
  generating a plurality of image templates, wherein said image templates are generated from a scene not proximate a vehicle, wherein each of said image templates comprise a two dimensional array of pixels, and value of each of the pixel is a function of a specific distance to a point in the scene not proximate the vehicle;
  producing an image of a scene proximate a vehicle, wherein said image comprise a two dimensional array of pixels and value of each of the pixel is a function of a specific distance to a point in the scene proximate the vehicle;
  comparing said image to said plurality of generated image templates; and
  identifying a match between said image and at least one of said plurality of generated image templates.

2. The method of claim 1 wherein the function of the specific distance to a point in the scene not proximate the vehicle is disparity and the function of the specific distance to a point in the scene proximate the vehicle is disparity.

3. The method of claim 1 wherein the function of the specific distance to a point in the scene not proximate the vehicle is depth and the function of the specific distance to a point in the scene proximate the vehicle is depth.

4. The method of claim 1 wherein the point in the scene not proximate the vehicle is a point on an object.

5. The method of claim 1 wherein the point in the scene proximate the vehicle is a point on an object.

6. The method of claim 1 wherein the generating step further comprises rendering at least one object model according to at least one object parameter.

7. The method of claim 6 wherein the object model is a vehicle model.

8. The method of claim 6 wherein the object model is a pedestrian model.

9. The method of claim 6 wherein the object model is a cyclist model.

10. The method of claim 6 wherein said at least one object parameter is a position dimension in a 3D volume relative to the vehicle.

11. The method of claim 6 wherein said at east one object parameter is a pose dimension in a 3D volume relative to the vehicle.

12. The method of claim 6 wherein said at least one object parameter is a position dimension in a 3D volume relative to the vehicle and said at least one other object parameter is of a pose dimension in a 3D volume relative to the vehicle.

13. The method of claim 6 wherein the object model is a 3D model.

14. The method of claim 13 wherein the 3D object model is a cuboid.

15. The method of claim 1 further comprising adjusting a parameter of the vehicle in response to the match of said image template.

16. The method of claim 1 further comprising:
  imaging the scene proximate the vehicle with a stereo camera to produce stereo images; and processing the stereo images to produce the image of a scene proximate a vehicle.

17. The method of claim 1 wherein the comparing step further comprises:
   differencing each of the pixels in the image and each similarly positioned pixel in the image template; and
   if the difference at each pixel is less than a predefined amount, the pixel is deemed a match.

18. The method of claim 17 wherein the identifying step comprises:
   summing the number of pixels deemed a match and dividing the sum by a total number of pixels in the image template to produce a match score; and
   if the match score is greater than a predefined match score amount, the image template is deemed a match.

19. The method of claim 18 further comprising:
   spatially and/or temporally filtering the match score to produce a new match score; and
   if the new match score is greater than a predefined match score amount, the image template is deemed a match.

20. The method of claim 1 wherein the comparing step further comprises:
   dividing the image and the image template into a first half and a second half;
   differencing each of the pixels in the first half of the image and each similarly positioned pixel in the first half of the image template;
   if the difference at each pixel is less than a predefined amount, the pixel is deemed a first match;
   summing numbers of pixels deemed a first match and dividing the sum by a total number of pixels in the first half of the image template to produce a first match score;
   differencing each of the pixels in the second half of the image and each similarly positioned pixel in the second half of the image template;
   if the difference at each pixel is less than a predefined amount, the pixel is deemed a second match;
   summing numbers of pixels deemed a second match and dividing the sum by a total number of pixels in the second half of the image template to produce a second match score;
   multiplying the first match score with the second match score to determine a final match score;
   if the final match score is greater than a predefined match score amount, the image template is deemed a match.

21. The method of claim 1 further comprising:
   receiving information from a secondary sensor regarding at least one object in the scene proximate the vehicle; and
   using the information to limit a number of the image templates that are compared to the image.

22. The method of claim 1 further comprising:
   receiving information from a secondary sensor regarding at least one object in the scene proximate the vehicle; and
   using the information to validate the match.

23. The method of claim 1 further comprising:
   tracking the match across a plurality of images to determine a velocity and direction of the match.

24. The method of claim 1 further comprising:
   classifying the match with regard to size and shape.

25. The method of claim 15 wherein the parameter of the vehicle comprises at least one parameter selected from the group comprising of an air bag deployment parameter, a vehicle height parameter, a vehicle direction control parameter.

26. The method of claim 1, wherein the comparing step further comprises:
   dividing both the image and the image template into N regions, where each region of the image is associated with a corresponding region in the image template;
   differencing the pixels in the each of the N image regions and similarly positioned pixels in the N image template regions;
   if the difference at a pixel is less than a predefined amount, that pixel is deemed a match;
   summing the numbers of pixels in each of the N image template regions that are deemed a match, and then dividing that sum by a total number of pixels in each of the N image template regions to produce a match score;
   multiplying the match scores to determine a final match score; and if the final match score is greater than a predefined match score amount, the image template is deemed a match.

27. The method of claim 1 wherein said image of a scene proximate a vehicle include information as to which pixels in the image are invalid.

28. The method of claim 27 wherein said image is a disparity image.

29. The method of claim 28 further comprising producing a depth image from the disparity image.

30. The method of claim 1, further including the step of validating a target based at least partially on a match between the image and at least one of the image template.

31. The method of claim 30, wherein validating a target further depends on the output of a secondary sensor.

32. Apparatus for performing vehicular vision processing comprising:
   a stereo image preprocessor for producing at least one image of a scene proximate a vehicle, wherein said image comprise a two dimensional array of pixels, and value of each pixel is a function of a specific distance to a point in the scene proximate the vehicle;
   a database comprising a plurality of image templates, wherein said image templates are generated from a scene not proximate a vehicle, wherein each of said image templates comprise a two dimensional array of pixels, and value of each of the pixel is a function of a specific distance to point in the scene not proximate the vehicle;
   a target processor for comparing said at least one image of a scene proximate a vehicle to said plurality of generated image templates to identify a match between said image and at least one of said plurality of generated image templates.

33. The apparatus of claim 32 wherein the function of the specific distance to a point in the scene not proximate the vehicle is disparity and the function of the specific distance to a point in the scene proximate the vehicle is disparity.

34. The apparatus of claim 32 wherein the function of the specific distance to a point in the scene not proximate the vehicle is depth and the function of the specific distance to a point in the scene proximate the vehicle is depth.

35. The apparatus of claim 32 wherein the point in the scene not proximate the vehicle is a point on an object.

36. The apparatus of claim 32 wherein the point in the scene proximate the vehicle is a point on an object.

37. The apparatus of claim 32 further comprising a depth map generator for processing the at least one image to form a depth map of said scene proximate the vehicle, wherein said depth map comprise a two dimensional array of pixels, said generator configured to generate the plurality of image templates of objects derived from the scene not proximate a vehicle.

38. The apparatus of claim 32 wherein at least one object model is rendered according to at least one object parameter, said object model is rendered to generate said plurality templates of objects.

39. The apparatus of claim 32 wherein the target processor classifies the match.

40. The apparatus of claim 32 further comprises:
a secondary sensor that provides information regarding the scene.

41. The apparatus of claim 40 wherein the secondary sensor comprises at least one sensor selected from a group comprising a radar sensor, an active infrared sensor, a LIDAR sensor, or a SONAR sensor.

* * * * *